United States Patent Office 3,209,028
Patented Sept. 28, 1965

3,209,028
THIOL ANALOGS OF OXYALKYLENE AMINES
Ludwig A. Hartmann, Swarthmore, Pa., assignor to Atlas Chemical Industries, Inc., Wilmington, Del., a corporation of Delaware
No Drawing. Filed Dec. 9, 1960, Ser. No. 74,769
5 Claims. (Cl. 260—570.5)

This invention relates to oxyalkylene amines, and in particular, to oxyalkylene amines which have a thiol group substituted for a hydroxyl group of the oxyalkylene radical.

It is an object of this invention to provide novel oxyalkylene amines having a thiol group substituted for a hydroxyl group of the oxyalkylene radical and a method for preparing them.

It is another object of this invention to provide disulfide oxidation products of the thiol analogs of oxyalkylene amines of this invention and a method for preparing the disulfides.

It is a still further object of this invention to provide novel aqueous coolant compositions comprising water and a thiol analog of an oxyalkylene amine or a disulfide of said thiol analog.

Other objects and advantages of this invention will be apparent to one skilled in the art from the full and complete disclosure which follows.

It has been discovered that oxyalkylene amines can be converted to their thiol analogs, i.e. a hydroxyl group of the oxyalkylene radical can be converted to a thiol group. It has also been discovered that these thiol analogs of oxyalkylene amines are useful as lubricants when dissolved or dispersed in aqueous coolant compositions. In addition, the disulfides which are prepared by oxidizing the thiol analogs of oxyalkylene amines of this invention are also useful in aqueous coolants.

In attempting to prepare the thiol analogs of oxyalkylene amines, it has been found that the reactivity of the oxyalkylene group hydroxyl is low and that the oxyalkylene chain is easily cleaved, and these factors contribute to the production of low yields of the desired thiol. For example, in attempting to convert hydroxyl groups of oxyalkylene amines directly to the thiol group by reacting an oxyalkylene amine with thiourea in the presence of concentrated halogen acids, low yields of the desired thiol were produced and thiols having lower molecular weights than the starting oxyalkylene amine were also produced.

It has been found that the problems of low hydroxyl group reactivity and chain cleavage can be overcome by preparing the halide intermediates of oxyalkylene amines, isolating the halide intermediate, and then reacting it with a sulfur-containing compound to substitute a thiol group for each halogen atom. The final reaction product is an oxyalkylene amine, an amino nitrogen of which is directly attached to a terminal carbon atom of an oxyalkylene radical and said oxyalkylene radical has a thiol group substituted for a hydroxyl group.

Any primary or secondary oxyalkylene amine can be converted to its thiol analog in accordance with this invention, with the products derived from higher fatty amines being particularly good aqueous coolant compositions. The only requirement is that the amine contain at least 1 oxyalkylene group which has an unreacted hydroxyl group. The following are typical amines whose oxyalkylene derivatives can be used as starting materials in the preparation of the thiol analogs of oxyalkylene amines of this invention:

Butylamine
Cyclohexylamine
Hexadecylamine
Octadecylamine
Octadecenylamine
Hexadecyl trimethylene diamine
Octadecyl trimethylene diamine
Aniline
Benzylamine
Diphenylamine
Ethyl-butylamine
Cyclopentyl-propylamine
Hexadecyl-ethylamine
Cyclopentyl-cyclohexylamine
Phenyl-ethylamine
Dehydroabietinylamine As previously stated, the amines used to prepare the compounds of this invention must be oxyalkylated, as for example by reaction with an alkylene oxide, such as ethylene oxide or propylene oxide, to form an oxyalkylene amine containing at least 1 oxyalkylene group which has an unreacted hydroxyl group. In general, the amine may contain any number of oxyalkylene groups, the only requirement being that the oxyalkylene group or chain have an unreacted hydroxyl group. Generally, however, oxyalkylene amines containing more than 300 oxyalkylene groups are not preferred because there is no substantial benefit gained by having more than 300 oxyalkylene groups present. It should be noted that the oxyalkylene amine can contain either a single type of alkylene oxide group or mixed alkylene oxide groups such as an ethylene oxide-propylene oxide amine.

In preparing the thiol analogs of oxyalkylene amines, it has been found advantageous to first prepare a halide intermediate which is then reacted with a sulfur-containing material and neutralized to form the thiol analog. The halide intermediate may be prepared by reacting the oxyalkylene amine with any halogenating agent capable of replacing a hydroxyl group with a halogen atom, such as the halogen acids, phosphorus halides, and thionyl halides. It was discovered that when a strong halogenating agent such as a halogen acid was used to form the halide intermediate, chain cleavage occurred in the oxyalkylene amine. Therefore, it is preferred to use a milder halogenating agent, e.g., an acid halide, which forms increased yields of the desired thiol analog. A particularly preferred method for preparing the halide intermediate is to react an oxyalkylene amine with thionyl chloride in the presence of a material which will react with the hydrogen chloride which is formed during the reaction, such as pyridine, and thereby to reduce to prevent the chain cleavage caused by the hydrogen chloride. The halide intermediate may be recovered by extracting the impurities from the final reaction mixture with several portions of water and sodium carbonate solution, and solvents may be removed by evaporation in vacuo.

The conversion of the halide intermediate to the thiol analog is carried out by reacting the halide with a sulfur-containing material capable of substituting a thiol group for the halogen atom or atoms of the halide. Examples of materials which may be used to convert the halide to a thiol are a sodium ethoxide or alcoholic potassium hydroxide solution containing excess hydrogen sulfide, aqueous metal sulfhydrates, thiosulfate and thiourea. It has been found that very good quantitative conversions can be achieved by reacting the halide intermediate with an aqueous solution of excess thiourea, after which the thiouronium salt which is formed is converted to a thiol by contacting it with an alkaline solution and then neutralizing the solution by adding acid such as concentrated HCl. The thiol analog may be recovered from the final reaction mixture by distillation.

A preferred method of preparing the thiol analogs of oxyalkylene amines of this invention is illustrated by the following equations:

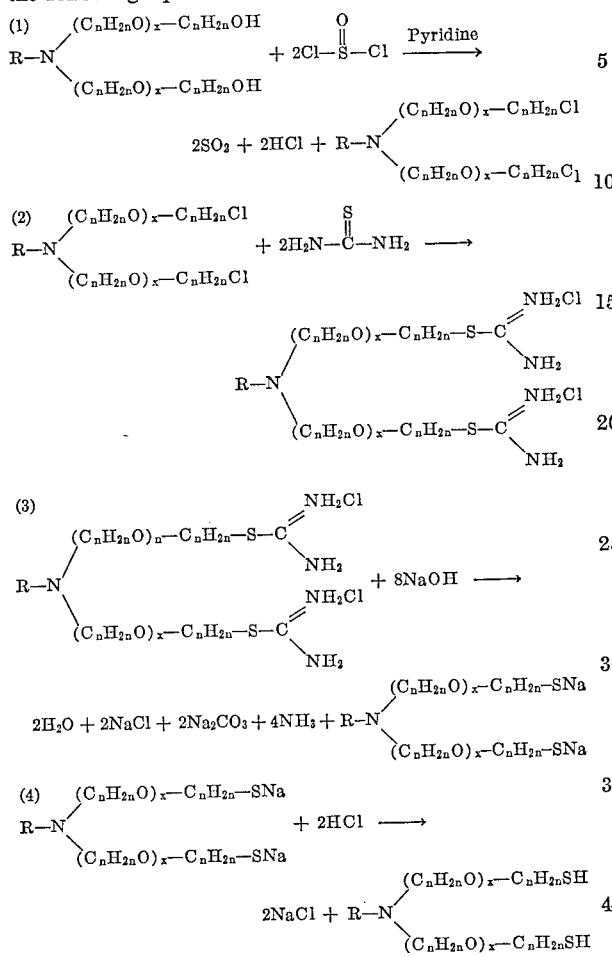

A preferred group of thiol analogs of oxyalkylene amines of this invention may be represented by the following general formula:

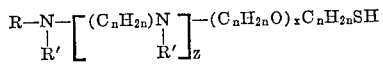

in which $n$ is a number ranging from 2 to 3; Z is a number ranging from 0 to 4; $x$ is a number ranging from 0 to about 100; R is selected from the group consisting of alkyl, aryl and alkaryl; and R' is selected from the group consisting of hydrogen, alkyl, aryl, alkaryl,

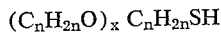

and $(C_nH_{2n}O)_x\ C_nH_{2n}OH$. Whenever used in the specification and/or claims of this application, $n$, $x$, Z, R and R' have the same meaning as above. Furthermore, it should be noted that the above general formula is intended to include the thiol analogs of polyoxyalkylene rosin amines and polyoxyalkylene imidazolines.

The reactions represented by Equations 1 to 3 are generally carried out under non-oxidizing conditions, e.g. a nitrogen atmosphere, to promote the formation of thiol though some disulfide may be formed. It has been discovered that the disulfides of the thiol analogs of this invention are also useful as aqueous coolants, and therefore, the conversion of the thiol analogs of oxyalkylene amines to disulfides is within the scope of this invention.

Thiol analogs of oxyalkylene amines may be converted to their disulfides by contacting them with a mild oxidizing agent. Examples of mild oxidizing agents which may be used to prepare the disulfides are dilute solutions of hydrogen peroxide, cupric chloride, or iodine.

As previously stated, the thiol analogs of oxyalkylene amines and their disulfides are useful as aqueous coolants. For best results as lubricants for aqueous metal cutting coolants, the thiol analogs of oxyalkylene amines and their disulfides should have sufficient polyoxyethylene content for ready dispersibility or solubility in water. Therefore, it is preferred that the thiol analogs and their disulfides contain about 5 or more moles of alkylene oxide per mole of amine, though thiol analogs of amines having only 1 alkylene oxide mole per mole of amine may be dispersible in water, especially if an emulsifier is used to aid the water dispersibility.

The aqueous coolant compositions of this invention may contain the thiol analog of oxyalkylene amines or their disulfides in a wide range of amounts. However, aqueous coolant compositions containing less than about 0.5 weight percent of the sulfur-containing compound have little or no advantage as coolants over water alone, and adding more than about 5.0 weight percent is generally uneconomical relative to the improvement in coolant properties.

The following examples illustrate several embodiments of thiol analogs of oxyalkylene amines and their preparation.

EXAMPLE I

A sample of polyoxyethylene (20) "Armeen TD" ("Armeen TD" is a commercially available higher fatty amine mixture of about 2 wt. percent tetradecyl amine, 24 wt. percent hexadecyl amine, 28 wt. percent octadecyl amine and 46 wt. percent octadecenyl amine) amounting to 189.5 g. (0.25 mole) was mixed with 19.8 g. of pyridine (0.25 mole) in a 500 ml. 3 neck flask, provided with a thermometer, stirrer and dropping funnel. The solution was cooled to 20° C. and the dropwise addition of 18.5 cc. of thionyl chloride (0.256 mole) was started. The dropwise addition of thionyl chloride was carried out over a period of 2.5 hours, at a temperature held between 20° and 29° C. by occassional cooling in an ice bath.

The solution darkened gradually and was then heated at 95° C. for 3 hours. Upon cooling to room temperature, 20 cc. of pyridine was added, the mixture cooled to 10° C., and the remainder of the calculated amount of thionyl chloride (18.5 cc.; 0.256 mole) was added slowly for about 1 hour while the temperature of the mixture was held at about 10° C. by occasional cooling. Upon warming, a slight exotherm was noted around 65°–70° C. Additional heating at 100° C. for 3 hours was carried out without reflux. The mixture was cooled and 200 cc. of chloroform and 150 ml. of water was added. The water extraction was repeated three times.

The crude product was then washed four times with 150 cc. portions of 5% sodium carbonate solution, followed by two 150 ml. portions of distilled water. The solvents were then evaporated under reduced pressure, leaving 148.9 g. of the chloro derivative of polyoxyethylene (20) "Armeen TD." This represented a 75.2% yield. Analysis of the chloro derivative showed 8.50 wt. percent Cl, 0.92 wt. percent N and a hydroxyl equivalent of 4.2 present in the chloro derivative, indicating that very few of the hydroxyl groups present had not reacted.

EXAMPLE II

The preparation of the chloro intermediate of polyoxyethylene (20) "Armeen TD" was also carried out in a different manner, a one-step operation. The reagents were used in the ratio of 2 moles of pyridine and thionyl chloride to one mole of polyoxyethylene (20) "Armeen TD." The addition of thionyl chloride to 731 g. of polyoxyethylene (20) "Areen TD" was carried out dropwise at 22° to 35° C. Three portions of 100 ml. of chloroform were added during the addition of thionyl chloride when stirring of the reaction mixture became very difficult because of high viscosity. After adding all of the thionyl chloride, the mixture was heated for 3.5 hours and maintained at a temperature ranging from 83° to 93° C. After cooling the reaction mixture to room temperature, 500 cc. of chloroform was added, and the crude product was extracted with three portions of 600 cc. of distilled water and twice with 600 cc. of 5% sodium carbonate solution.

Generally good separations were achieved in the extraction with dilute sodium carbonate solution while the extractions with distilled water tended to produce stable emulsions. The solvents were removed at 60° C. under reduced pressure yielding 722.2 g. of chloro intermediate. This represented a 94.1% yield. Analysis of the final reaction product showed that 7.4 wt. percent Cl, 1.29 wt. percent N, 0.65 wt. percent S and a hydroxyl equivalent of 5.5 were present in the chloro intermediate of polyoxyethylene (20) "Armeen TD."

EXAMPLE III 138 g. of the chloro intermediate of polyoxyethylene (20) "Armeen TD" produced in Example I was converted to a thiol by reacting it with 37.7 g. of thiourea dissolved in 125 cc. of water. This reaction mixture was heated for 52.5 hours, the temperature being maintained between 90°–100° C. Upon cooling, a solution of 26.4 g. NaOH (0.66 mole) in 270 cc. of water was added and the mixture reheated to about 100° C. for 2 hours. Then the reaction mixture was cooled and neutralized with 54 cc. of a 1:1 aqueous hydrochloric acid solution to a pH of about 7. The thiol portion separated well upon standing for some time, after which the aqueous layer was drawn off and discarded. About 150 cc. of chloroform was added to the thiol portion and this solution extracted 5 times with 150 cc. portions of water to remove water-soluble impurities, the thiol remaining in the chloroform solvent. Solvent was then removed from the extracted chloroform solution by evaporation in vacuo.

The final product amounted to 110.2 g. which represented an 80.4% yield. Analysis of the final product showed that 6.25 wt. percent S, 0.40 wt. percent Cl and 2.27 wt. percent N were present in the thiol analog of poloyoxyethylene (20) "Armeen TD."

EXAMPLE IV 708 g. of the chloro intermediate of polyoxyethylene (20) "Armeen TD" prepared in Example II was reacted with 168 g. of thiourea dissolved in 600 cc. of distilled water in order to convert the chloro intermediate to a thiol. The reaction mixture was heated and maintained at a temperature of about 103° C. for a period of 48 hours. As in the process of Example III, 10% sodium hydroxide solution was added to the reaction mixture which was then reheated to about 100° C. for 2 hours. Then the mixture was neutralized with concentrated hydrochloric acid to a pH of about 7, and the thiol phase was separated from the aqueous phase.

700 cc. of chloroform was added to the thiol phase and the chloroform-thiol solution was extracted with 600 cc. of water. In order to ensure a high recovery of product, this extract was combined with the original aqueous phase and additional product was recovered by a single extraction with 500 cc. of chloroform. The chloroform solutions of thiol product were washed with 4 portions of equal volume of water. Solvent was then evaporated under vacuo.

624.7 g. of thiol product was recovered, amounting to an 88.8% yield. Analysis of the final product indicated that 7.52 wt. percent S, 1.86 wt. percent N, 0.46 wt. percent Cl and 0.34 wt. percent Cl were present in the thiol analog of polyoxyethylene (20) "Armeen TD."

EXAMPLES V–XI

Additional chloro intermediates, based on oxyethylene amines of various types and ethylene oxide chain lengths, were also prepared employing reaction conditions similar to those employed in Examples I and II. All reactions were carried out in the presence of an equivalent amount of pyridine, and chloroform was added to the reaction mixtures when the viscosity increased to such a degree that adequate stirring was prevented. Generally, equivalent amounts of thionyl chloride were added dropwise at temperatures between 0° and 30° C. It was found that no difficulties were encountered in the addition of the thionyl chloride although, generally, temperatures in the range of 0° to 5° C. gave best results. Completion of the reactions was carried out, in general, during a 3.5 hour heating period at temperatures of about 100° C. The products were then diluted with chloroform, washed with several portions of a dilute sodium carbonate solution and dilute sodium sulfate solution and finally recovered by evaporation of chloroform.

The following oxyalkylene amines were employed in the syntheses:

| Example | Compound |
|---------|----------|
| V | Polyoxyethylene (20) polyoxypropylene (8) butylamine. |
| VI | Polyoxyethylene (5) "Armeen TD." |
| VII | Polyoxyethylene (10) "Armeen TD." |
| VIII | Polyoxyethylene (10) dehydroabietinylamine ("Rosin Amine D"). |
| IX | Polyoxyethylene (10) "Armeen C."* |
| X | Polyoxyethylene (10) tallow trimethylene diamine ("Duomeen T"). |
| XI | Polyoxyethylene (50) octadecyl amine. |

*"Armeen C" is a commercially available mixture of higher fatty amines containing about 8 wt. percent octylamine, 9 wt. percent decylamine, 47 wt. percent dodecylamine, 18 wt. percent tetradecylamine, 8 wt. percent hexadecylamine, 5 wt. percent octadecylamine and 5 wt. percent octadecenylamine.

The experimental details of Examples V to XI are summarized in Table I.

Table I

| Example | Amount | | | Temp. (° C.) | | Reaction | |
|---------|--------|--|--|--------------|--|----------|--|
| | Oxyalkylene amine (g.) | Pyridine (g.) | SOCl₂ (cc.) | Adding SOCl₂ | Reaction | Time (hrs.) | Yield, g. |
| V | 150 | 22.6 | 20.8 | 20–30 | 90–103 | 6.5 | 116.5 |
| VI | 204.5 | 79.1 | 73 | 7–29 | 95–103 | 7.0 | 214.0 |
| VII | 175 | 43.3 | 40 | 3–28 | 95–103 | 6.0 | 138.6 |
| VIII | 200 | 45.8 | 42 | 10–28 | 98–100 | 6.5 | 180.1 |
| IX | 200 | 74.5 | 71.5 | 4–20 | 100–105 | 10.0 | 163.6 |
| X | 200 | 76.5 | 70.5 | 0–50 | 90–95 | 6.0 | 217.4 |
| XI | 200 | 24.3 | 22.5 | 25–35 | 100–105 | 5.0 | 182.8 |

In all of the above examples (V to XI) the chloro intermediates were formed without difficulty and the yields were good. The products contained only small amounts of residual sulfur.

EXAMPLES XII–XVIII

In Examples XII–XVIII, samples of the chloro intermediates prepared in Examples V–XI were used to prepare thiol analogs of the oxyalkylene amines by reaction with thiourea. It was found that the chloro analogs of oxyalkylene amines required a considerably longer reaction time with thiourea for conversion to the thiols than is usual for alkyl chlorides. Essentially quantitative conversion of the chloro analogs to thiols was accomplished by treating an approximately 50% aqueous solution with 50% excess thiourea at about 100° C. for about 48 hours. The intermediate isothiuronium salts were decomposed by a two hour treatment with dilute sodium hydroxide solution at elevated temperature, and the thiols were then isolated after neutralization and purification by extraction.

The experimental details of Examples XII–XVIII are summarized in Table II.

Table II

| Example | Chloro derivative of Example | Amount Chloro compd. (g.) | Amount Thiourea (g.) | Amount Water (cc.) | Temp. (°C.) | Time (hrs.) | Yield (g.) |
|---|---|---|---|---|---|---|---|
| XII | V | 104.0 | 21.7 | 100 | 100 | 48 | 98.5 |
| XIII | VI | 175.0 | 89.6 | 160 | 95–100 | 48 | 164.8 |
| XIV | VII | 131.0 | 44.1 | 125 | 97–100 | 48 | 129.6 |
| XV | VIII | 168.0 | 52.7 | 155 | 95–100 | 48 | 164.0 |
| XVI | IX | 147.0 | 59.0 | 140 | 95–100 | 48 | 140.5 |
| XVII | X | 180.4 | 91.4 | 175 | 93–100 | 48 | 162.7 |
| XVIII | XI | 176.4 | 30.2 | 165 | 96–100 | 48 | 176.4 |

All of the chloro intermediates were easily converted to the thiols and the yields were good. The products contained only small amounts of residual chlorine.

EXAMPLE XIX

In this example, the thiol analog of polyoxyethylene (20) "Armeen TD" was oxidized to its corresponding disulfide which is also useful as a lubricant for aqueous coolants.

A sample of 100 g. of the thiol analog of polyoxyethylene (20) "Armeen TD" (0.117 mole) prepared in Example IV was dissolved in 50 cc. of absolute ethanol, and while cooling, a solution of 9.4 g. of sodium hydroxide (0.234 mole) in 30 cc. of water was added. Iodine solution was prepared by dissolving 70 g. of potassium iodide and 32 g. of iodine (0.25 g. atom) in 200 cc. of water.

The iodine solution was slowly added to the alkaline solution of thiol while cooling slightly to maintain the temperature at 28° C. After the addition was complete (25 minutes), the product was stirred for one hour at room temperature. Most of the ethanol was removed at reduced pressure and a temperature of about 60° C. A highly viscous solution resulted which was transferred to a separatory funnel.

The crude product was taken up in 300 cc. of chloroform and the aqueous phase discarded. The chloroform solution was extracted once with 150 ml. of water, twice with 10% sodium thiosulfate and twice again with 150 ml. of 7% sodium sulfate. Troublesome emulsions were avoided when the extractions were carried out with dilute sodium sulfate solution. The chloroform solution was then evaporated under reduced pressure, yielding 102 g. of disulfide. Analysis of the disulfide product showed that it contained 6.35 wt. percent S, 1.50 wt. percent N and 0.44 wt. percent Cl.

As previously stated, the thiol analogs of oxyalkylene amines and their disulfide derivatives are effective lubricants for aqueous metal cutting coolants. As is well known in the art, water is an excellent coolant for metal cutting processes but does not contribute lubricity to facilitate the cutting. It has been found that when the compounds of this invention are dissolved or dispersed in water, the aqueous coolant composition retains the excellent cooling property of water and also acquires good lubricating properties.

Aqueous coolant compositions consisting essentially of water and from about 0.1 to about 5.0 weight percent of the thiol analogs of oxyalkylene amines and/or their disulfide derivatives are included within the scope of this invention. Coolants containing less than about 0.1 weight percent of the thiols or disulfides usually exhibit little or no advantage over using only water as a coolant, whereas amounts greater than about 5.0 weight percent often do not sufficiently improve the coolant composition to merit their addition.

EXAMPLE XX

In this example, several aqueous coolant compositions were tested for their cooling and lubricating properties. A tapping test, whereby pre-drilled holes in steel plates were threaded, was set up as a convenient bench scale test which has shown good precision and correlation with actual field results.

The test apparatus consisted of a drill press, an automatic tapping head, a table to hold the test plate, and means to measure and record torque developed in cutting threads in the holes and the time required for cutting the threads. The coolant composition being tested was flowed over the tap and hole in the workpiece and recirculated by means of a small pump.

Each workpiece had 20 holes in it which had to be threaded, and the time to thread these holes and the torque developed in doing it was measured for each of the materials listed in Table III with less torque developed and less time to thread being desirable. Aqueous coolant compositions using the materials in Table III as lubricants were tested and a commercially available, heavy duty, soluble cutting oil was compared to them. The results are reported in percent efficiency, and since the heavy duty, soluble cutting oil was compared to the aqueous coolants, values of 100 or better indicate superior performance, though aqueous coolants having lesser values are acceptable. The thiol analogs and their disulfide derivatives were also tested for solubility in water, for in order to be useful in aqueous coolants they must be soluble or dispersible in water.

Table III

| Thiol Derivative | Conc. (wt. percent) | Solubility | Efficiency percent Torque | Efficiency percent Time |
|---|---|---|---|---|
| Thiol analog of polyoxyethylene (5) "Armeen TD." | 1.0 | Dispersible | 79 | 31 |
| Thiol analog of polyoxyethylene (10) dehydroabietinylamine. | 1.0 | Soluble | 116 | 84 |
| Thiol analog of polyoxyethylene (20) "Armeen TD." | 0.5 | Dispersible | 105 | 108 |
| Do | 1.0 | do | 122 | 108 |
| Do | 3.0 | do | 142 | 132 |
| Thiol analog of polyoxyethylene (20) polyoxypropylene (8) butylamine. | 1.0 | do | 100 | 113 |
| Thiol analog of polyoxyethylene (10) tallow trimethylene diamine. | 1.0 | do | 100 | 68 |
| Thiol analog of polyoxyethylene (50) octadecylamine. | 1.0 | Soluble | 108 | 95 |
| Disulfide of the thiol analog of polyoxyethylene (20) "Armeen TD." | 1.0 | do | 119 | 111 |

These results, indicate that, in general, the thiol analogs of oxyalkylene amines and their disulfide derivatives perform well as lubricants for aqueous coolant compositions. Many of the materials gave particularly outstanding results.

It should be noted that as used in this specification and in the claims to follow, the term "consisting essentially of" includes compositions containing the named ingredients in the proportions stated and any other ingredients which do not deleteriously affect the compositions for the purposes stated in the specification.

Having completely described this invention, what is claimed is:

1. An amine compound represented by the following general formula:

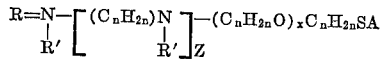

in which $n$ is a number ranging from 2 to 3; Z is a number ranging from 0 to 4; $x$ is a number ranging from 1 to about 300; R is selected from the group consisting of alkyl, phenyl and phenyl alkyl; R' is selected from the group consisting of hydrogen, alkyl, phenyl, phenyl alkyl, $(C_nH_{2n}O)_xC_nH_{2n}SH$ and $(C_nH_{2n}O)_xC_nH_{2n}OH$; and A is selected from the group consisting of hydrogen and the following radical

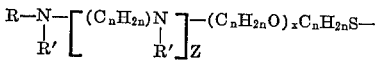

2. The amine compound defined in claim 1 wherein $n$ is equal to 2.

3. The amine compound defined in claim 1 wherein $x$ is a number within the range of about 2 to 100.

4. The amine compound of claim 3 wherein $x$ is within the range of about 10 to 50.

5. The amine compound of claim 4 wherein $x$ is within the range of about 10 to 30.

References Cited by the Examiner

UNITED STATES PATENTS

| | | | |
|---|---|---|---|
| 2,042,830 | 6/36 | Cox | 252—77 |
| 2,163,181 | 6/39 | Ulrich et al. | 260—583 |
| 2,164,565 | 7/39 | Britton et al. | 252—77 |
| 2,214,352 | 9/40 | Schoeller et al. | 260—584 X |
| 2,304,623 | 12/42 | Berchet | 260—583 |
| 2,498,195 | 2/50 | Ballard et al. | 260—584 |
| 2,657,238 | 10/53 | Vaughan et al. | 260—583 |

OTHER REFERENCES

Fieser et al.: "Organic Chemistry," p. 148 (1950).

Gilman: "Organic Chemistry," 2nd ed., vol. 1, pp. 841 and 861 (1953).

Migrdichian: "Organic Synthesis," Reinhold Publishing Corp., New York, N.Y. (1957) vol. 1, p. 26.

Reid: "Organic Chemistry of Bivalent Sulfur," Chemical Publishing Co., Inc., New York, N.Y. (1958), vol. 1, pp. 32–35.

CHARLES B. PARKER, *Primary Examiner*.

LEON ZITVER, JOSEPH P. BRUST, *Examiners*.

UNITED STATES PATENT OFFICE
CERTIFICATE OF CORRECTION

Patent No. 3,209,028            September 28, 1965

Ludwig A. Hartmann

It is hereby certified that error appears in the above numbered patent requiring correction and that the said Letters Patent should read as corrected below.

Column 3, equation (3), the expression "$(C_nH_{2n}O)_n$-" read -- $(C_nH_{2n}O)_x$- --; column 9, lines 4 to 7, for that portion of formula reading "R=N-" read -- R-N- --.

Signed and sealed this 31st day of January 1967.

(SEAL)
Attest:

ERNEST W. SWIDER            EDWARD J. BRENNER
Attesting Officer            Commissioner of Patents